United States Patent
Ma et al.

(10) Patent No.: US 9,902,624 B2
(45) Date of Patent: *Feb. 27, 2018

(54) PREPARATION METHOD FOR COMPOSITE FERRATE REAGENT

(71) Applicant: Harbin Institute of Technology, Harbin, Heilongjiang Province (CN)

(72) Inventors: Jun Ma, Harbin (CN); Yulei Liu, Harbin (CN); Lu Wang, Harbin (CN); Xiaodan Zhao, Harbin (CN); Qingliang Liu, Harbin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/111,995

(22) PCT Filed: Apr. 30, 2014

(86) PCT No.: PCT/CN2014/076683
§ 371 (c)(1),
(2) Date: Jul. 15, 2016

(87) PCT Pub. No.: WO2015/106505
PCT Pub. Date: Jul. 23, 2015

(65) Prior Publication Data
US 2016/0326011 A1  Nov. 10, 2016

(30) Foreign Application Priority Data
Jan. 15, 2014  (CN) .......................... 2014 1 0018596

(51) Int. Cl.
*C01G 49/00* (2006.01)
*B01J 20/02* (2006.01)

(52) U.S. Cl.
CPC ................. *C01G 49/0081* (2013.01)

(58) Field of Classification Search
CPC .................................................. C01G 49/0081
USPC .......... 423/140, 142, 143; 424/646; 502/406
See application file for complete search history.

(56) References Cited

PUBLICATIONS

Zhang et al. "Influence of impurities on stability of composite ferrate solution" Feb. 2008.*

* cited by examiner

*Primary Examiner* — Haytham Soliman
(74) *Attorney, Agent, or Firm* — Novoclaims Patent Services LLC; Mei Lin Wong

(57) ABSTRACT

A preparation method for a composite ferrate reagent. 1, Weigh raw materials; 2, evenly mix a ferric salt, an activating agent and an alkali maintaining agent and heat the mixture; 3, add an oxidant solution; and 4, cool and mix the solution with water. The technical problems of high energy consumption, low yield and poor ferrate product stability of the existing method for preparing ferrate are solved. The obtained product can be stably stored, and the yield of the ferrate reaches 60% to 95%.

14 Claims, No Drawings

PREPARATION METHOD FOR COMPOSITE FERRATE REAGENT

CROSS REFERENCE OF RELATED APPLICATION

This is a national phase national application of an international patent application number PCT/CN2014/076683, filing date Apr. 30, 2014, which claimed priority of Chinese application number 201410018596.8, filing date Jan. 15, 2014. The contents of these specifications, including any intervening amendments thereto, are incorporated herein by reference.

BACKGROUND OF THE PRESENT INVENTION

Field of Invention

The present invention relates to a preparation method of a compound.

Description of Related Arts

At present, the basic preparation method of ferrate salts includes three types: (1) wet oxidation; (2) electrolysis; (3) high temperature peroxidation (dry method). However, these methods have a certain level of limitation for applications in industrial production. The technology of hypochlorite oxidation process is mature and the yield and purity are good. However, during the process, the temperature is required to keep at near zero degree Celsius, and the operation process is complicated and susceptible to introduction of other contaminants. The process of electrolysis is simple in operation and its raw materials consumption is low. However, the power consumption is high, the number of by-products is great, the number of influencing factors is great and the yield is low. The high temperature peroxidation process has a high purity while the yield is relatively low. Besides, a higher temperature is required for the process and there is the risk of explosion.

Since the treatment with ferrate salts has multifunctional water purification effect such as oxidation, adsorption, co-precipitation, disinfection, sterilization and algae removal, it is an ideal treatment agent for industrial wastewater and drinking water. At present, the limitations of large scale application of ferrate salts are complex preparation process of different preparation method, low yield of ferrate salts, great investment for commercial production, and the production cost is too high.

In Russ J Inorg Chem, 34 (1989), pp. 1250-1253, Y. M. Kiselev et al. disclosed a preparation method of ferrate salts in which iron oxide and sodium peroxide are heated under 370° C. while oxygen gas are introduced at the same time. The operation of this method is very difficult and there exists a danger of explosion. In "Preparation and purification of potassium ferrate(VI)" Chem Anal, 73 (1951), pp. 1379-1381, G. W. Thompson et al. disclosed a preparation method of ferrate salts which utilizes alkaline sodium hypochlorite and ferric nitrate to produce the ferrate salts, then saturated potassium hydroxide is used for precipitation of ferrate product in solid state. The preparation process requires that the temperature is controlled to not exceeding 20° C. while this preparation process requires purification by organic substances such as benzene, ethanol and ethyl ether. In the U.S. Pat. No. 5,746,994A, the preparation method of ferrate salts which utilizes monoperoxosulfate under a strong base environment to oxidize ferric sulfate is disclosed. However, this method requires an ice bath and the reaction temperature is required to be controlled below 0° C. In the patent publication number WO2012044358A1, publication date Aug. 7, 2013, Virende K. Sharma disclosed a preparation method which utilizes three methods to obtain a ferrate intermediate, the ferrite. The three methods are: heating ferric salts and sodium peroxide under 400~650° C.; an electrochemical process; and burning a mixture of iron salts and ethylene glycol. Then, adding a halogen solution or introducing ozone to the ferrate intermediate after cooling to obtain the ferrate solution. This preparation process is very complicated and requires heating to a relatively high temperature or electrical power input, thus power consumption is relatively high. In the patent number CA2703708C, publication date: Jan. 31, 2012, Lee Edward Ciampi et al. disclosed an electrochemical preparation process to produce ferrate continuously by utilizing a two-reaction chamber and a two-electrode system. The efficiency of this method is affected by many factors which include the electrode materials, composition of the electrolytes and current density, and there also exists the problem of electrode purification. In recent years, domestic scholars are increasingly concerned about the application of ferrate salts in contaminant removal from drinking water. However, due to the lack of experience and reference of mature preparation methods, the implementation of commercial production of ferrate is not yet realized in the country.

SUMMARY OF THE PRESENT INVENTION

In order to solve the problems of conventional preparation method of ferrate salts, which includes high energy consumption, low yield and poor stability of ferrate salt products, an object of the present invention is to provide a preparation method for ferrate composite agent.

Technical Solution

A preparation method for ferrate composite agent, specifically, the method comprises the following steps of:

(1) weighing and obtaining iron salt, activate agent, alkalinizing agent and oxidizing agent solution, wherein a molar ratio of iron salt and activate agent is 1:0.001~10, a molar ratio of iron salt and alkalinizing agent is 1:2~20, a molar ratio of iron salt and oxidizing agent in the oxidizing agent solution is 1:0.1~10;

(2) mixing the iron salt, the activate agent and the alkalinizing agent obtained from the step (1) uniformly, heating to a heating temperature of 30° C.~398° C. and maintaining for a heating period of 1 min~60 min, and obtaining a mixture;

(3) adding the oxidizing agent solution from the step (1) to the mixture in the step (2), wherein an adding time is controlled below 10 minutes, then obtaining a precursor; and (4) cooling the precursor obtained from the step (3) naturally, then mixing the precursor with water according to a volume ratio of the precursor and the water of 1:1~5, stirring uniformly and obtaining the ferrate composite agent.

In the above process, if the iron salt is a composition, the ratio of different ingredients is any ratio; if the activate agent is a composition, the ratio of its ingredients is any ratio; if the alkalinizing agent is a composition, the ratio of its ingredients is any ratio; if the oxidizing agent is a composition, the ratio of its ingredients is any ratio.

In the step (2), if the alkalinizing agent is sodium carbonate, sodium bicarbonate, potassium bicarbonate or potassium carbonate, the ferrate salts produced is bright purple in color; if the alkalinizing agent is sodium hydroxide or potassium hydroxide, the ferrate salts produced is gray purple in color.

In the step (2), if the heating temperature is 30~150° C., the addition of activate agent can increase the conversion efficiency of ferrate salt by 20~40%; if the temperature is 151~398° C., the addition of activate agent can increase the conversion efficiency of ferrate salt by 10~20%; where the activate agent being added has the same composition as the activate agent in step (1).

Advantageous Effect

The present invention provides a preparation method of ferrate composite reagent. First, the present invention combines the process of heating and adding oxidizing agent solution to achieve a heating temperature of suitable range and the operating process is safe and fast. Second, the present invention is capable of maintaining an alkaline environment for the ferrate even by using a strong base and a weak acid salt. The usage of base is reduced and the production cost is lowered. Meanwhile, the resulting ferrate solution be produced does not require any pH adjustment and can be used directly in treatment of drinking water, wastewater, sludge, gas and etc. On the other hand, the ferrate salt product produced by the preparation method of the present invention has a relatively higher stability even when existing in liquid state, therefore the process of purification and solidification can be omitted and the production process is greatly simplified, or the ferrate salt produced by the method of the present invention can be produced for immediate use. According to the method of the present invention, the yield of ferrate salt can reach 60%~95%.

The present invention is used for preparing a ferrate composite reagent.

DETAILED DESCRIPTION OF THE PREFERRED EMBODIMENT

The embodiment of the present invention as shown and described below is exemplary only and not intended to be limiting. This invention includes all combinations of different embodiments of the present invention.

Preferred embodiment 1: According to a preparation method for ferrate composite agent of the preferred embodiment of the present invention, the method comprises the following steps:

(1) weighing and obtaining iron salt, activate agent, alkalinizing agent and oxidizing agent solution, wherein a molar ratio of iron salt and activate agent is 1:0.001~10, a molar ratio of iron salt and alkalinizing agent is 1:2~20, a molar ratio of iron salt and oxidizing agent in the oxidizing agent solution is 1:0.1~10;

(2) mixing the iron salt, the activate agent and the alkalinizing agent obtained from the step (1) uniformly, heating to a heating temperature of 30° C.~398° C. and maintaining for a heating period of 1 min~60 min, and obtaining a mixture;

(3) adding the oxidizing agent solution from the step (1) to the mixture in the step (2), wherein an adding time is controlled below 10 minutes, then obtaining a precursor; and (4) cooling the precursor obtained from the step (3) naturally, then mixing the precursor with water according to a volume ratio of the precursor and the water of 1:1~5, stirring uniformly and obtaining the ferrate composite agent.

Preferred embodiment 2: The difference between this preferred embodiment and the above preferred embodiment 1 is that: in the step (1), the iron salt is one or a combination of two or more of the followings: ferric chloride, ferrous chloride, ferric nitrate, ferrous nitrate, ferric sulfate and ferrous sulfate. All others are the same as that of the above preferred embodiment 1.

Preferred embodiment 3: The difference between this preferred embodiment and the above preferred embodiment 1 is that: in the step (1), the activate agent is one or a combination of two or more of the followings: potassium permanganate, potassium dichromate, potassium chlorate, persulfate and monopersulfate. All others are the same as that of the above preferred embodiment 1.

Preferred embodiment 4: The difference between this preferred embodiment and the above preferred embodiment 1 is that: in the step (1), the alkalinizing agent is one or a combination of two or more of the followings: sodium hydroxide, sodium carbonate, sodium bicarbonate, potassium hydroxide, potassium bicarbonate and potassium carbonate. All others are the same as that of the above preferred embodiment 1.

Preferred embodiment 5: The difference between this preferred embodiment and the above preferred embodiment 1 is that: in the step (1), the oxidizing agent is one or a combination of two or more of the followings: potassium permanganate, potassium dichromate, hydrogen peroxide, ozone, sodium hypochlorite, potassium hypochlorite, potassium chlorate, perchlorate, persulfate and monopersulfate. The concentration of the oxidizing agent solution is 0.1 mol/L~3 mol/L. All others are the same as that of the above preferred embodiment 1.

Preferred embodiment 6: The difference between this preferred embodiment and one of the above preferred embodiment 1-5 is that: in the step (1), the concentration of the oxidizing agent solution is 1.5 mol/L. All others are the same as that of one of the above preferred embodiment 1-5.

Preferred embodiment 7: The difference between this preferred embodiment and the above preferred embodiment 1 is that: in the step (2), the heating temperature is 31° C.~150° C. All others are the same as that of the above preferred embodiment 1.

Preferred embodiment 8: The difference between this preferred embodiment and the above preferred embodiment 1 is that: in the step (2), the heating temperature is 151° C.~397° C. All others are the same as that of the above preferred embodiment 1.

Preferred embodiment 9: The difference between this preferred embodiment and the above preferred embodiment 1 is that: in the step (2), the heating period is 8 min~10 min. All others are the same as that of the above preferred embodiment 1.

Preferred embodiment 10: The difference between this preferred embodiment and the above preferred embodiment 1 is that: in the step (2), the heating period is 25 min~30 min. All others are the same as that of the above preferred embodiment 1.

The following exemplary embodiments are used to test and verify the advantageous effect of the present invention:

Exemplary Embodiment 1

According to a preparation method for ferrate composite agent of this exemplary embodiment of the present invention, the method comprises the following steps:

(1) Weighing and obtaining 2.5 g ferric nitrate, 0.5 g potassium dichromate, 2.2 g potassium hydroxide and 5 mL hydrogen peroxide solution (concentration: 1.5 mol/L);

(2) Mixing the ferric nitrate, the potassium dichromate and the potassium hydroxide obtained from step (1) uniformly, heating to 300° C., maintaining for 5 min and obtaining a mixture;

(3) Adding the 5 mL hydrogen peroxide solution (concentration 1.5 mol/L) obtained from the step (1) to the mixture obtained from the step (2), controlling an adding time to less than 0.5 minute, and obtaining a precursor; and (4) cooling the precursor obtained from step (3) naturally, then mixing the precursor with 5 mL water, stirring uniformly and obtaining the ferrate composite agent with a yield of 73~75%.

Exemplary Embodiment 2

According to a preparation method for ferrate composite agent of this exemplary embodiment of the present invention, the method comprises the following steps:

(1) Weighing and obtaining 2.0 g ferric sulfate, 0.5 g activate agent, 2.2 g potassium hydroxide and 5 mL hydrogen peroxide solution (concentration 3 mol/L), where the activate agent is a mixture of potassium persulfate and potassium permanganate of which the mass ratio of potassium persulfate and potassium permanganate is 4:1;

(2) Mixing the ferric sulfate, the activate agent and the potassium hydroxide obtained from step (1) uniformly, heating to 200° C., maintaining for 7.5 min and obtaining a mixture;

(3) Adding the 5 mL hydrogen peroxide solution (concentration 3 mol/L) obtained from step (1) to the mixture obtained from the step (2), controlling an adding time to less than 0.5 minute, and obtaining a precursor; and (4) cooling the precursor obtained from step (3) naturally, then mixing the precursor with 5 mL water, stirring uniformly and obtaining the ferrate composite agent with a yield of 90~93%.

Exemplary Embodiment 3

According to a preparation method for ferrate composite agent of this exemplary embodiment of the present invention, the method comprises the following steps:

(1) Weighing and obtaining 2.5 g ferric nitrate, 0.5 g activate agent, 2.2 g potassium hydroxide and 5 mL sodium hypochlorite solution (concentration 2 mol/L), where the activate agent is a mixture of potassium dichromate and potassium chlorate at a mass ratio of 3:2;

(2) Mixing the ferric nitrate, the activate agent and the potassium hydroxide obtained from step (1) uniformly, heating to 150° C., maintaining for 10 min and obtaining a mixture;

(3) Adding the 5 mL sodium hypochlorite solution (2 mol/L) obtained from the step (1) to the mixture obtained from the step (2), controlling an adding time to less than 0.5 minute and obtaining a precursor; and (4) cooling the precursor obtained from step (3) naturally, then mixing the precursor with 5 mL water, stirring uniformly and obtaining the ferrate composite agent with a yield of 83~86%.

Exemplary Embodiment 4

According to a preparation method for ferrate composite agent of this exemplary embodiment of the present invention, the method comprises the following steps:

(1) Weighing and obtaining 2.5 g ferric nitrate, 0.5 g activate agent, 2.2 g potassium hydroxide and 5 mL perchloric acid solution (1.5 mol/L), where the activate agent is a mixture of potassium dichromate and peroxydisulfates at a mass ratio of 2:3;

(2) Mixing the ferric nitrate, the activate agent and the potassium hydroxide obtained from step (1) uniformly, heating to 350° C., maintaining for 5 min and obtaining a mixture;

(3) Adding the 5 mL perchloric acid solution (1.5 mol/L) obtained from step (1) to the mixture obtained from the step (2), controlling an adding time to less than 2 minute, and obtaining a precursor; and (4) cooling the precursor obtained from step (3) naturally, then mixing the precursor with 5 mL water, stirring uniformly and obtaining the ferrate composite agent with a yield of 90~93%.

Exemplary Embodiment 5

According to a preparation method for ferrate composite agent of this exemplary embodiment of the present invention, the method comprises the following steps:

(1) Weighing and obtaining 2.5 g ferric nitrate, 0.5 g activate agent, 2.2 g potassium hydroxide and 5 mL ozone solution (concentration 0.1 mol/L), where the activate agent is a mixture of potassium dichromate and monopersulfate at a mass ratio of 1:4;

(2) Mixing the ferric nitrate, the activate agent and the potassium hydroxide obtained from step (1) uniformly, heating to 40° C., maintaining for 5 min and obtaining a mixture;

(3) Adding the 5 mL ozone solution (0.1 mol/L) obtained from step (1) to the mixture obtained the step (2), controlling an adding time to less than 0.5 minute and obtaining a precursor; and (4) cooling the precursor obtained from step (3) naturally, then mixing the precursor with 5 mL water, stirring uniformly and obtaining the ferrate composite agent with a yield of 86~90%.

Exemplary Embodiment 6

According to a preparation method for ferrate composite agent of this exemplary embodiment of the present invention, the method comprises the following steps:

(1) Weighing and obtaining 1.5 g ferric chloride, 0.5 g potassium permanganate, 2.2 g potassium hydroxide and 5 mL potassium hypochlorite solution (concentration 2 mol/L);

(2) Mixing the ferric chloride, the potassium permanganate and the potassium hydroxide obtained from step (1) uniformly, heating to 300° C., maintaining for 5 min and obtaining a mixture;

(3) Adding the 5 mL potassium hypochlorite solution (2 mol/L) obtained from step (1) to the mixture obtained from the step (2), controlling an adding time to less than 1 minute and obtaining a precursor; and (4) cooling the precursor obtained from step (3) naturally, then mixing the precursor with 10 mL water, stirring uniformly and obtaining the ferrate composite agent with a yield of 91~93%.

Exemplary Embodiment 7

According to a preparation method for ferrate composite agent of this exemplary embodiment of the present invention, the method comprises the following steps:

(1) Weighing and obtaining 2.5 g ferric chloride, 0.5 g potassium dichromate, 2.2 g potassium hydroxide and 5 mL hydrogen peroxide solution (concentration 1.5 mol/L);

(2) Mixing the ferric chloride, the potassium dichromate and the potassium hydroxide obtained from step (1) uniformly, heating to 200° C., maintaining for 15 min and obtaining a mixture;

(3) Adding the 5 mL hydrogen peroxide solution (1.5 mol/L) obtained from step (1) to the mixture obtained from the step (2), controlling an adding time to less than 0.5 minute and obtaining a precursor; and (4) cooling the precursor obtained from step (3) naturally, then mixing the precursor with 5 mL water, stirring uniformly and obtaining the ferrate composite agent with a yield of 82~84%.

Exemplary Embodiment 8

According to a preparation method for ferrate composite agent of this exemplary embodiment of the present invention, the method comprises the following steps:

(1) Weighing and obtaining 2.5 g ferric chloride, 0.5 g potassium dichromate, 2.2 g sodium carbonate and 5 mL potassium persulfate solution (1.5 mol/L);

(2) Mixing the ferric chloride, the potassium dichromate and the sodium carbonate obtained from the step (1) uniformly, heating to 200° C., maintaining for 9 min and obtaining a mixture;

(3) Adding the 5 mL potassium persulfate solution (1.5 mol/L) obtained from step (1) to the mixture obtained from the step (2), controlling an adding time to less than 2 minute and obtaining a precursor; and (4) cooling the precursor obtained from step (3) naturally, then mixing the precursor with 5 mL water, stirring uniformly and obtaining the ferrate composite agent with a yield of 89~93%.

Exemplary Embodiment 9

According to a preparation method for ferrate composite agent of this exemplary embodiment of the present invention, the method comprises the following steps:

(1) Weighing and obtaining 2.5 g ferric nitrate, 0.5 g potassium dichromate, 2.2 g potassium hydroxide and 5 mL hydrogen peroxide solution (concentration 1.5 mol/L);

(2) Mixing the ferric nitrate, the potassium dichromate and the potassium hydroxide obtained from step (1) uniformly, heating to 390° C., maintaining for 20 min and obtaining a mixture;

(3) Adding the 5 mL hydrogen peroxide solution (1.5 mol/L) obtained from step (1) to the mixture obtained from the step (2), controlling an adding time to less than 5 minute and obtaining a precursor; and (4) cooling the precursor obtained from step (3) naturally, then mixing the precursor with 5 mL water, stirring uniformly and obtaining the ferrate composite agent with a yield of 73~78%.

What is claimed is:

1. A preparation method for ferrate composite agent, characterized in that, the preparation method for ferrate composite agent comprises the steps, in order, of:
(1) weighing iron salt, activate agent, alkalinizing agent and oxidizing agent solution obtain a molar ratio of iron salt and activate agent of 1:0.001~10, a molar ratio of iron salt and alkalinizing agent of 1:2~20, a molar ratio of iron salt and oxidizing agent in the oxidizing agent solution of 1:0.1~10;

(2) mixing said iron salt, said activate agent and said alkalinizing agent obtained from the step (1) uniformly, heating said iron salt, said activate agent and said alkalinizing agent after mixing to a heating temperature of 150° C.~390° C. and maintaining said iron salt, said activate agent and said alkalinizing agent after heating for a heating period of 5 min~20 min, and obtaining a mixture;

(3) adding said oxidizing agent solution from the step (1) to said mixture in the step (2), wherein an adding time is controlled below 10 minutes, then obtaining a precursor; and (4) cooling said precursor obtained from the step (3) naturally, then mixing said precursor with water according to a volume ratio of said precursor and said water of 1:1~5, stirring uniformly and obtaining the ferrate composite agent;

wherein in the step (1), said activate agent is one or a combination of two or more selected from the group consisting of: potassium permanganate, potassium dichromate, potassium chlorate, persulfate and monopersulfate; and said oxidizing agent is one or a combination of two or more selected from the group consisting of: potassium permanganate, potassium dichromate, hydrogen peroxide, ozone, sodium hypochlorite, potassium hypochlorite, potassium chlorate, perchlorate, persulfate and monopersulfate, wherein a concentration of said oxidizing agent solution is 0.1 mol/L~3 mol/L.

2. The preparation method for ferrate composite agent according to claim 1, characterized in that, in the step (1), said iron salt is one or a combination of two or more selected from the group consisting of: ferric chloride, ferrous chloride, ferric nitrate, ferrous nitrate, ferric sulfate and ferrous sulfate.

3. The preparation method for ferrate composite agent according to claim 1, characterized in that, in the step (1), said alkalinizing agent is one or a combination of two or more selected from the group consisting of: sodium hydroxide, sodium carbonate, sodium bicarbonate, potassium hydroxide, potassium bicarbonate and potassium carbonate.

4. The preparation method for ferrate composite agent according to claim 1, characterized in that, said concentration of said oxidizing agent solution is 1.5 mol/L.

5. A preparation method for ferrate composite agent, consisting the steps, in order, of:
(1) weighing iron salt, activate agent, alkalinizing agent and oxidizing agent solution obtain a molar ratio of iron salt and activate agent of 1:0.001~10, a molar ratio of iron salt and alkalinizing agent of 1:2~20, a molar ratio of iron salt and oxidizing agent in the oxidizing agent solution of 1:0.1~10, wherein said activate agent is one or a combination of two or more selected from the group consisting of: potassium permanganate, potassium dichromate, potassium chlorate, persulfate and monopersulfate, wherein said oxidizing agent is one or a combination of two or more selected from the group consisting of: potassium permanganate, potassium dichromate, hydrogen peroxide, ozone, sodium hypochlorite, potassium hypochlorite, potassium chlorate, perchlorate, persulfate and monopersulfate, wherein a concentration of said oxidizing agent solution is 0.1 mol/L~3 mol/L;

(2) mixing said iron salt, said activate agent and said alkalinizing agent obtained from the step (1) uniformly, heating said iron salt, said activate agent and said alkalinizing agent after mixing to a heating temperature of 150° C.~390° C. and maintaining said iron salt, said activate agent and said alkalinizing agent after heating for a heating period of 5 min~20 min, and obtaining a mixture;

(3) adding said oxidizing agent solution from the step (1) to said mixture in the step (2), wherein an adding time is controlled below 10 minutes, then obtaining a precursor; and (4) cooling said precursor obtained from the step (3) naturally, then mixing said precursor with water according to a volume ratio of said precursor and said water of 1:1~5, stirring uniformly and obtaining the ferrate composite agent.

6. The preparation method for ferrate composite agent according to claim 5, wherein in the step (1), said iron salt is a divalent iron compound.

7. The preparation method for ferrate composite agent according to claim 5, wherein in the step (1), said iron salt is a trivalent iron compound.

8. The preparation method for ferrate composite agent according to claim 5, wherein in the step (1), said iron salt is one or a combination of the group consisting of a divalent iron compound or a trivalent iron compound.

9. The preparation method for ferrate composite agent according to claim 5, wherein in the step (1), said iron salt is one or a combination of two or more selected from the group consisting of: ferric chloride, ferrous chloride, ferric nitrate, ferrous nitrate, ferric sulfate and ferrous sulfate.

10. The preparation method for ferrate composite agent according to claim 5, wherein in the step (1), said iron salt is one or a combination of two or more selected from the group consisting of: ferrous chloride, ferrous nitrate, and ferrous sulfate.

11. The preparation method for ferrate composite agent according to claim 5, wherein in the step (1), said alkalinizing agent is one or a combination of two or more selected from the group consisting of: sodium hydroxide, sodium carbonate, sodium bicarbonate, potassium hydroxide, potassium bicarbonate and potassium carbonate.

12. The preparation method for ferrate composite agent according to claim 9, wherein in the step (1), said alkalinizing agent is one or a combination of two or more selected from the group consisting of: sodium hydroxide, sodium carbonate, sodium bicarbonate, potassium hydroxide, potassium bicarbonate and potassium carbonate.

13. The preparation method for ferrate composite agent according to claim 5, wherein said concentration of said oxidizing agent solution is 1.5 mol/L.

14. The preparation method for ferrate composite agent according to claim 12, wherein said concentration of said oxidizing agent solution is 1.5 mol/L.

* * * * *